United States Patent [19]
Lux

[11] Patent Number: 4,477,745
[45] Date of Patent: Oct. 16, 1984

[54] DISC ROTOR PERMANENT MAGNET GENERATOR

[76] Inventor: Gregory F. Lux, 218 School St., Woburn, Mass. 01801

[21] Appl. No.: 561,955

[22] Filed: Dec. 15, 1983

[51] Int. Cl.³ .......................................... H02K 21/12
[52] U.S. Cl. .................................. 310/156; 310/184; 310/268
[58] Field of Search ............... 310/156, 168, 180, 184, 310/194, 261, 266, 268, 254

[56] References Cited

U.S. PATENT DOCUMENTS

| | | | |
|---|---|---|---|
| 2,993,159 | 7/1961 | Devol | 310/156 X |
| 3,762,042 | 10/1973 | Abe et al. | 310/156 X |
| 3,803,433 | 4/1974 | Ingenito | 310/156 |
| 4,187,441 | 2/1980 | Oney | 310/156 X |
| 4,211,945 | 7/1980 | Tawse | 310/156 X |

Primary Examiner—Mark O. Budd
Attorney, Agent, or Firm—William Nitkin

[57] ABSTRACT

A permanent magnet generator having a plurality of magnets mounted, extending from either side of a central rotor disk adapted to pass between both an inner stator and an outer stator so as to induce current therein.

4 Claims, 7 Drawing Figures

DISC ROTOR PERMANENT MAGNET GENERATOR

BACKGROUND OF THE INVENTION

1. Field of the Invention

This invention relates to permanent magnet generators and more particularly relates to a new magnet and stator configuration.

2. History of the Prior Art

Generators of the type using permanent magnets incorporated into their rotor and coils in their stator are well known in the art. Some patents showing inventions relating to same are as follows:

| | | |
|---|---|---|
| 2,927,229 | Merrill | 03/01/60 |
| 3,355,645 | Kawakami | 11/28/67 |
| 3,390,291 | Eberline | 06/25/68 |
| 3,581,394 | Phelon | 06/01/71 |
| 3,849,682 | Binns | 11/19/74 |
| 3,914,629 | Gardener | 10/21/75 |
| 3,967,827 | Lehmann | 07/06/76 |
| 3,979,619 | Whiteley | 09/07/76 |
| 4,002,937 | Anson | 01/11/77 |
| 4,012,651 | Burson | 03/15/77 |

SUMMARY OF THE INVENTION

The present invention provides a unique design for a plurality of magnets arrayed on a rotor adapted to pass them between an inner and outer stator, each containing coils in which current is induced. The magnets are specially shaped to be positioned against or near one another at their midpoints around the disk-like rotor while their tops and bottoms are bevelled on each side to avoid close proximity and the resulting undesirable overlapping magnetic field patterns. The magnets pass between the inner and outer stators, each having a plurality of coils so that for each revolution of the rotor more magnets pass by more coils than in the standard prior art generators having only an outer coil-carrying stator with fewer, more spaced-apart magnets. The magnets are in a dual configuration with a narrow interconnecting portion which may be of the same contiguous piece of material from which the magnets are manufactured or from a separate joining element.

DESCRIPTION OF THE PREFERRED EMBODIMENT(S)

Figure 1:
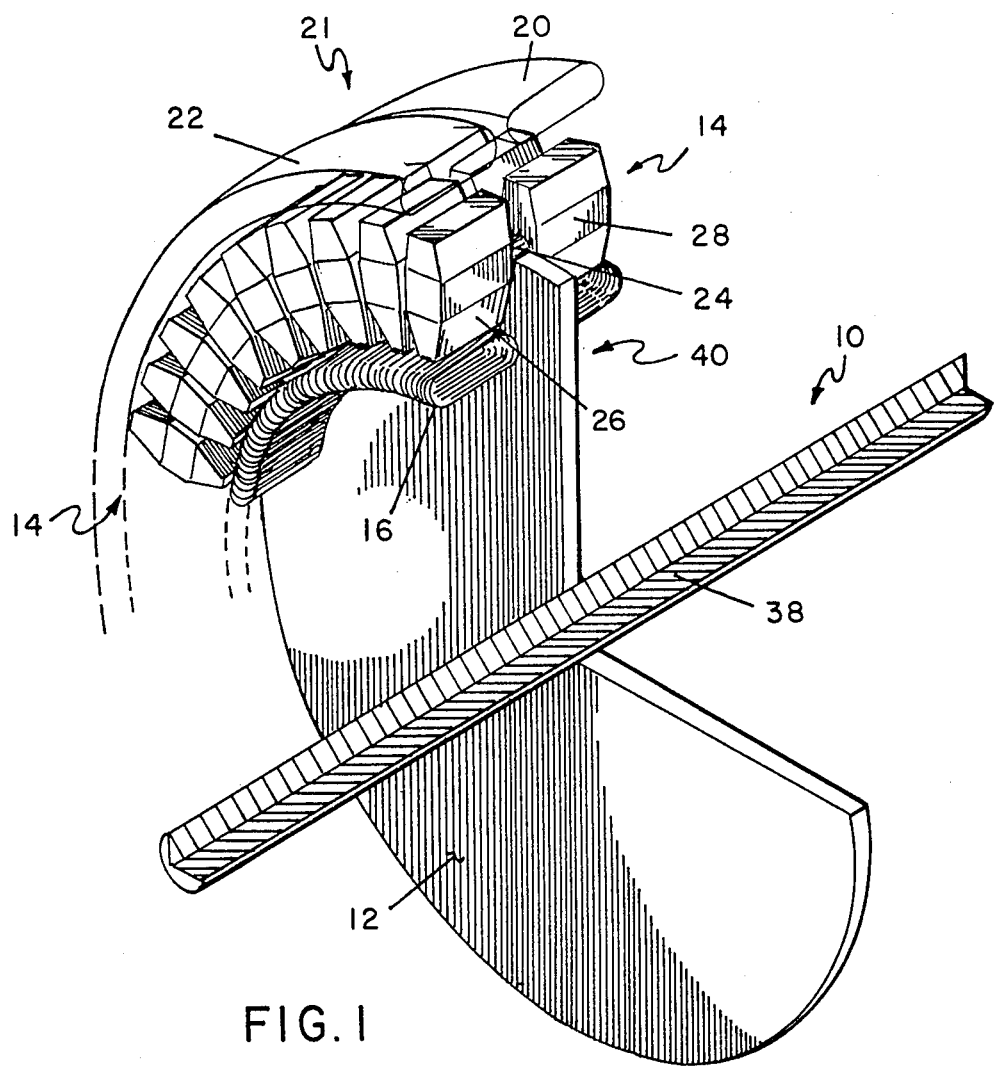
FIG. 1 illustrates a cutaway perspective view of a section of the improved generator of this invention.
Figures 2, 3:
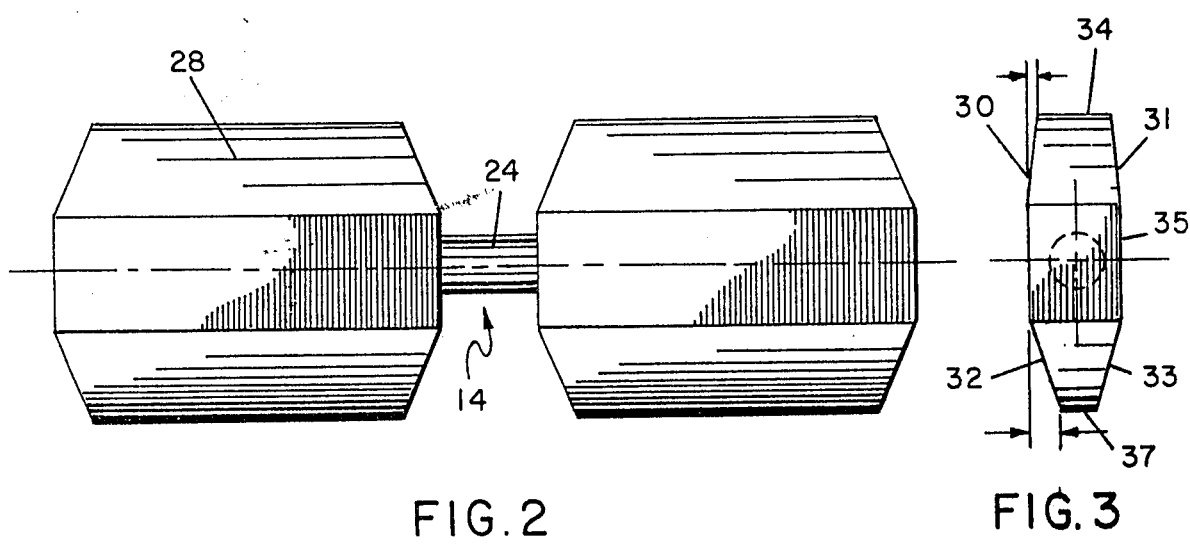
FIG. 2 illustrates a side view of a magnet of this invention.
FIG. 3 illustrates an end view of a magnet of this invention.

FIG. 1 illustrates a cutaway perspective view of a section of the magnetic generator of this invention. Seen in this view is axle 38 of rotor disk 12. Axle 38 can be supported at its ends by well-known conventional means not illustrated. Around rotor disk 12 is arrayed a plurality of magnet members 14. Magnet members 14 are affixed to rotor disk 12 by attachment clamps, bolts or any other well-known means of attachment. Each magnet member 14 has three basic sections: a first side magnet 26, a second side magnet 28 and a magnet interconnect 24 which can be of the same contiguous material as first side magnet 26 and second side magnet 28 or of different material affixed to these side magnets holding them in the proximity as seen in FIG. 2 and being the place where they are attached to rotor disk 12. First side magnet and second side magnet extend perpendicularly to and outwardly from rotor disk 12. Magnet members 14 are mounted so that their midsections 35 are in contact or in close proximity, and they are attached around the entire perimeter of rotor disk 12 forming a magnet rotor assembly 40. As seen in FIG. 3 each side magnet at its top 34 and bottom 37 has bevels such as 30, 31, 32 and 33 so that the tops and bottoms are not in contact or close proximity with the tops and bottoms of the next adjacent magnets. This feature prevents overlapping magnetic fields which would significantly decrease the amount of current generated. The top 34 may in some embodiments have a convex curved surface while bottom 37 may have a concave curve. An inner stator 16 is positioned immediately to the inside of the magnet/rotor assembly. The inner stator has two sides being separated on each side of rotor disk 12, each side being supported by the generator housing which is not shown. The inner stator's first side and second side are each wrapped on projections with a plurality of wire coils corresponding closely to but not necessarily the same as the number of magnets on the magnet rotor assembly 40. The outer stator 21 has two separate coil sections and is positioned circumferentially around magnetic rotor assembly 40 immediately above the top of magnetic rotor assembly 40. The first outer stator coil section 22 and the second outer stator coil section 20 each have coils in which current will be induced by the rotation of the magnetic rotor assembly 40. At the same time current will be induced in the inner stator's first and second sides' coils. Only depictions of possible positive and negative outputs are shown as such coil outputs are well known and other configurations could easily be accommodated in this invention. Using the configuration of magnets and coils of this invention creates a small but highly efficient generator.

Figure 4:
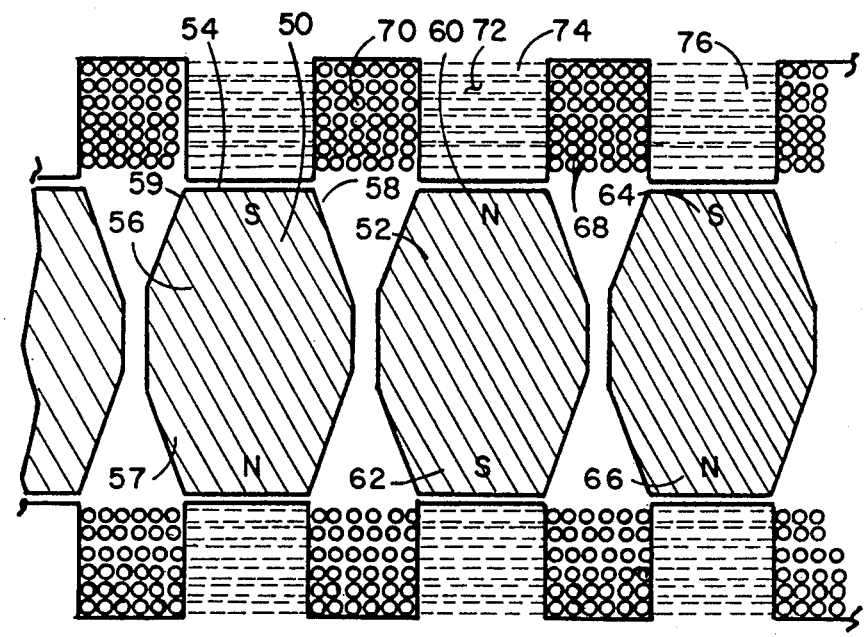
FIG. 4 illustrates an end view of a series of magnets between inner and outer stators showing magnetic pole arrangements.

FIG. 4 illustrates flux-created pole changes in this invention. The magnets are illustrated symetrically and horizontally for purposes of illustration. Seen in this view are the magnets passing between the inner (lower) and outer (upper) stator. The north pole 60 of magnet 52 is aligned with the stator coil retention projection 72 around which are wound coils, all seen in cross-sections such as coil 68 which loops over and becomes coil 70. The other coils form discrete loops around their enclosed stator retention projections with coil separations projections such as 76 separating the coils. As can be seen, the magnets shown in their entirety have a south-north-south alignment against the top stator with a reverse alignment against the lower stator. When the rotor assembly which is not shown moves the magnets to align with the next adjacent stator projection, the flux causes the poles to change so that, for example, the top pole of magnet 52 will become a south pole when aligned with coil separation projection 76 and its bottom pole will become a north pole and so on with each magnet changing its flux poles as it moves by each stator projection. This flux path changing makes a complete circuit and creates an alternating current.

Figures 5, 6, 7:
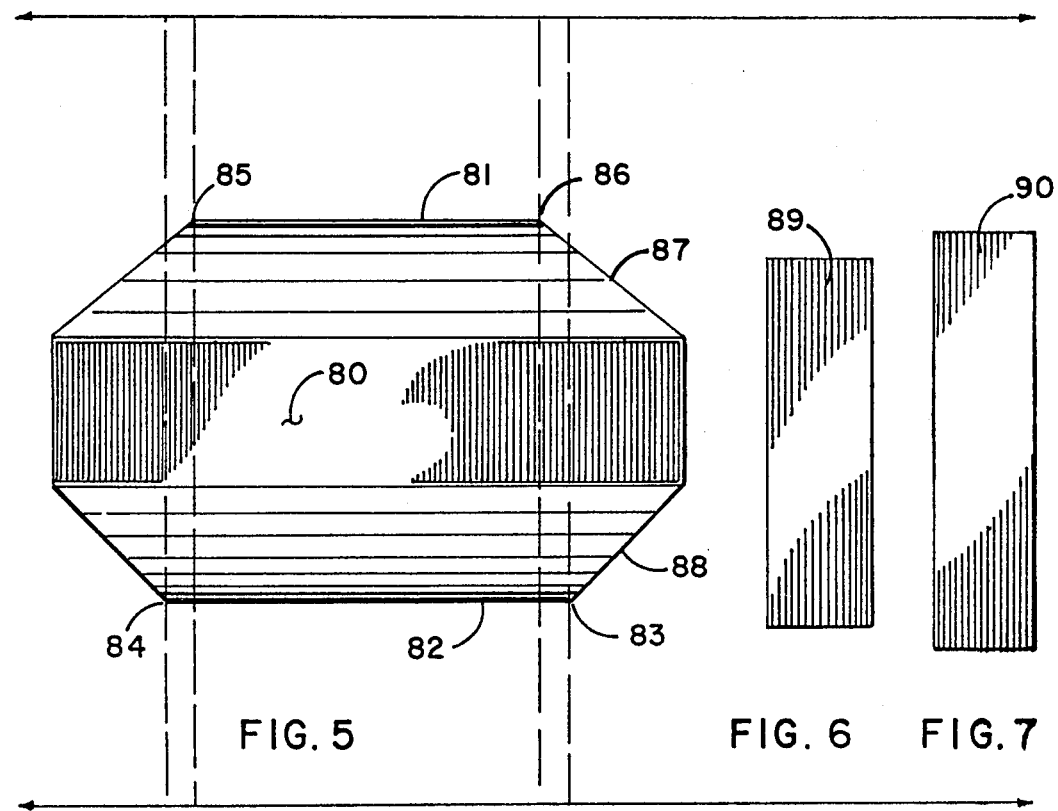
FIG. 5 illustrates a side view of a magnet having a longer bottom length than top length.
FIG. 6 illustrates a view of the top end of the magnet of FIG. 5.
FIG. 7 illustrates a view of the bottom end of the magnet of FIG. 5.

FIG. 5 illustrates a magnet 80 having a varied top bevel 87 and bottom bevel 88 yielding a smaller top length than bottom length. When keeping the surface areas of the top and bottom the same, the bottom 90 as shown in FIG. 7 is narrower than the top 89 shown in FIG. 6. The rest of the magnet is not illustrated in FIGS. 6 and 7 for clarity. The narrower bottom 90 allows for the small circumference of the inner stator having the magnets arrayed adjacent thereto but in a smaller space than the tops of the magnets arrayed adjacent to the outer stator. The increase in length of the narrower bottom allows for the same surface area to face the inner stator as the outer stator for proper balance of the magnetic field. This magnet surface area matching avoids any electrostatic discharge or heating on one side of the magnet.

In a further embodiment the magnets may have a plurality of laminations of metal, such as soft iron or equivalent, therebetween. The laminations may be vertical or horizontal between adjoining magnets. These laminations concentrate the magnetic field by causing it to be closer to each individual magnet.

Although the present invention has been described with reference to particular embodiments, it will be apparent to those skilled in the art that variations and modifications can be substituted therefor without departing from the principles and spirit of the invention.

I claim:

1. An improved permanent magnetic generator comprising:

a rotor disk;

a plurality of magnets mounted adjacent to one another on said rotor disk, said magnets adapted to extend beyond said disk on each side thereof and said magnets being bevelled at the sides of their tops and bottoms to prevent overlap of their magnetic fields;

an inner stator having a first and second side positioned immediately under said magnets on each side of said rotor disk, each side of said inner stator carrying a plurality of coils in which current can be induced by movement of said magnets on said rotor; and an outer stator positioned immediately above said magnets concentric to and circumferentially around said magnets having a first set of coils above the magnets on one side of said rotor disk and a second set of coils above the magnets on the other side of said rotor disk, said coils adapted so that a current is induced therein upon rotation of said magnets.

2. The device of claim 1 wherein said magnets are narrower at their central portion where they are attached to said rotor disk.

3. The device of claim 2 wherein the narrow portion of each of said magnets is of a different material from said magnets.

4. The device of claim 1 wherein the widths of the ends of said magnets adjacent to said inner stator are narrower than the widths of the ends of said magnets adjacent to said outer stator to accommodate the smaller circumference of said inner stator, and said inner and outer magnet ends being adapted in length to have the same surface area.

* * * * *